United States Patent [19]

Mühlbach

[11] 3,859,912

[45] Jan. 14, 1975

[54] HIGH FREQUENCY WELDING AND CUTTING MACHINES

[75] Inventor: Anton Mühlbach, Frankfurt/Main-Sossenheim, Germany

[73] Assignees: USM Corporation, Flemington, N.J.; USM Corporation, Boston, Mass.

[22] Filed: Sept. 28, 1972

[21] Appl. No.: 293,167

[52] U.S. Cl.................... 100/257, 83/62.1, 83/534, 100/226, 100/258 A
[51] Int. Cl........................................... B30b 15/24
[58] Field of Search..... 156/583; 100/258 R, 258 A, 100/256, 257, 266, 226; 83/62, 62.1, 534; 219/10.53

[56] References Cited
UNITED STATES PATENTS

| | | | |
|---|---|---|---|
| 1,607,609 | 11/1926 | Dezotell | 83/534 |
| 2,446,823 | 8/1948 | Grant | 100/258 A |
| 2,822,045 | 2/1958 | Moore | 100/257 X |
| 3,095,803 | 7/1963 | Linderoth | 100/257 |
| 3,204,506 | 9/1965 | Reinhold | 100/226 X |
| 3,248,984 | 5/1966 | Garwin | 100/226 |
| 3,478,678 | 11/1969 | Lickliter et al. | 100/256 |
| 3,511,177 | 5/1970 | Schiff | 100/257 |
| 3,526,188 | 9/1970 | Carlsson | 100/257 |
| 3,571,550 | 3/1971 | Rose et al. | 100/226 X |
| 3,587,452 | 6/1971 | Krause | 100/256 |

*Primary Examiner*—Billy J. Wilhite
*Attorney, Agent, or Firm*—Ralph D. Gelling; Vincent A. White; Richard B. Megley

[57] ABSTRACT

A cutting machine having a beam and table with a platen supported on a ram on the beam for movement transversely of and toward the table is provided with means for distortionlessly limiting movement of the platen relative to the ram and the ram relative to the beam. Distortion due to tilting out of parallelism between the platen and the table is avoided. Preferably the limiting means are, respectively, impulse emitters between the platen and ram, and means for engaging a slide support for the ram with the beam while the beam is in fixed orientation relative to the table.

1 Claim, 4 Drawing Figures

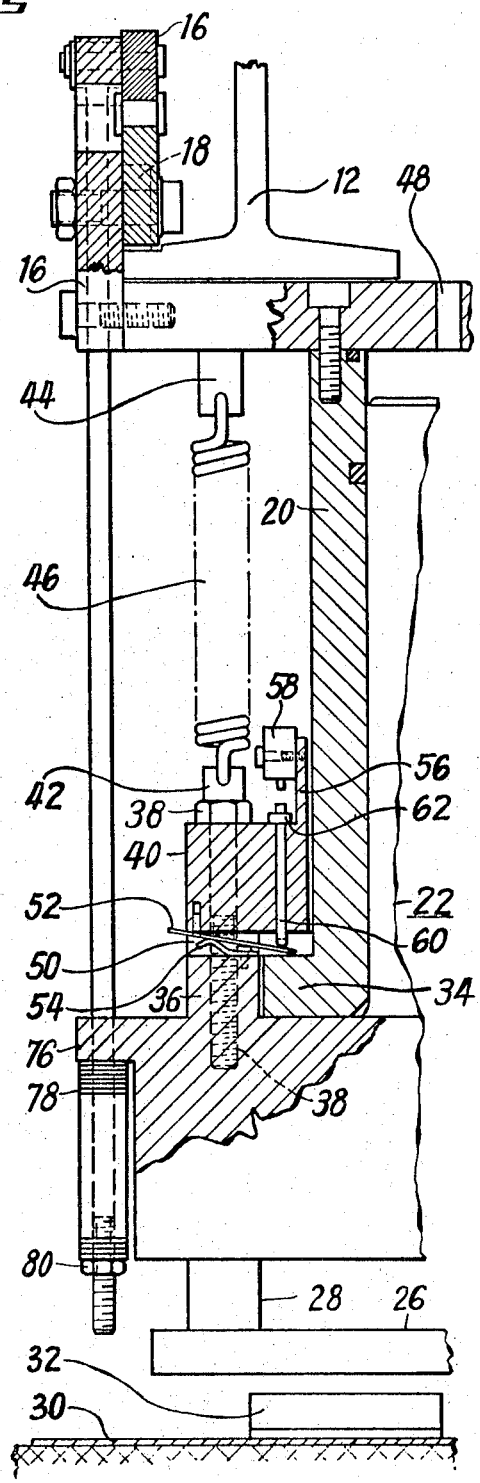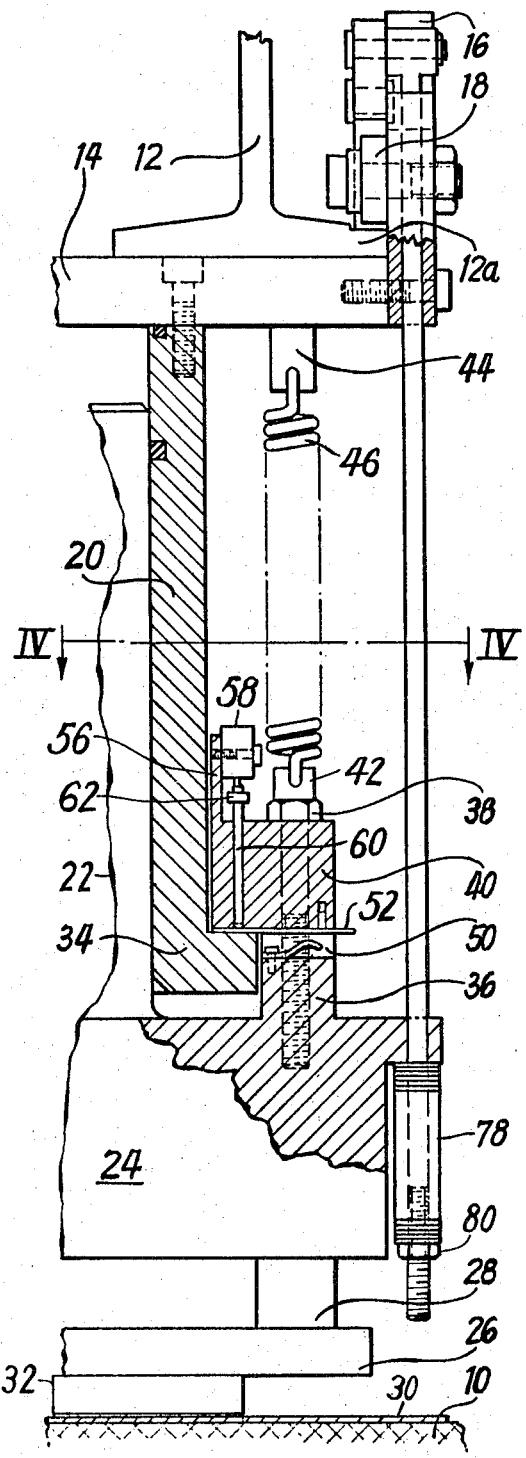

HIGH FREQUENCY WELDING AND CUTTING MACHINES

BACKGROUND OF THE INVENTION

The invention is concerned with cutting machines comprising a slide mounted on a beam for movement transversely of a work table adjacent to the beam, from which slide there extends downwardly an hydraulic ram the movable portion of which carries an insulated platen. The platen may be connected with a high frequency energy source. A knife and workpiece material are placed on the table adjacent the beam for cutting engagement by the platen.

Welding and cutting machines of this type are useful in the manufacture of shoes, for example. In addition to welding and cutting thermoplastic materials, leather and/or fabrics may also be bonded together by adding weldable interlayers or applying high frequency activatable adhesives. Reinforcing or cushioning interlayers can also be introduced between the materials to be welded so that the extent of use of such machines is still further increased.

In contrast with conventional cutting machines, in which the work table is covered with a relatively resilient support for the material to be cut, high frequency welding requires an electrically conductive support, often rigid metal, beneath the material to be cut. A thin insulating layer of paper, board or plastic may be used but does not provide substantial resiliency to the support. Thus a cutting knife meets rigid resistance immediately after severing the material moved by the platen. Premature blunting of the knife and damage to the table and the support consequently often result. This result is more pronounced when, during the cutting stroke, the normally downward gravitational force of the slide on the cross-beam is reversed by reaction of the ram to knife engagement of the material to be cut. The reversed force can distort the slide guide, thereby tipping the platen out of desired parallelism with the support and thus pressing the cutting knife non-uniformly against the material and support.

Attempts have been made to avoid this damaging result by so timing driving means for the ram in a cutting stroke that the knife just completes the cutting stroke under the momentum of the connected ram, platen and knife. This approach in no way eliminates distortion of the slide guide. In addition, incomplete cutting may result from the absence of adequate knife driving power.

SUMMARY OF THE INVENTION

Accordingly, an object of the invention is to overcome the aforementioned disadvantages and to provide a machine of the general type indicated such that parallelism between the striker plate and the table surface is assured and damage to the table or an insulating layer thereon is avoided without adversely affecting cutting of the material.

To this end, the ram is provided about its outer periphery with abutment means by which its stroke can be properly limited free of tilt or distortion and in that a stroke device actuatable by the ram resiliently engages the slide against the beam when the ram is operating. By the cooperation of the aforesaid features, an accurate termination of the cutting stroke may be achieved relative to the cross-beam and thus with respect to the table without damage to the cutting knife. The resilient engagement of the slide and beam when the ram operates advantageously reverses the direction of the force of the slide guide on the beam before the platen engages the cutting knife so that the slide is supported against the beam over its whole support surface. Exact parallelism between the platen and the table is thus insured; this parallelism is maintained during the welding process and the following severing of the material until the abutment means are rendered effective. No damage to the knife is incurred and accurate cutting is then obtained.

In a preferred embodiment of the invention, a high frequency welding and cutting machine, having a movable piston and a fixed cylinder of a ram for moving the platen, is provided with an annular flange on the cylinder and a massive ring freely embracing the cylinder is movable with the piston into engagement with the flange. To compensate for differing knife heights, spring loaded, adjustable spacers are introduced between the annular flange and the massive ring. At least three impulse emitters are spaced about the periphery of the ram to effect the return stroke of the ram only when each is activated by engagement of the ring and flange at each impulse emitter. Preferably the limit switches are secured on the upper surface of the ring and are actuatable by feelers movably projecting through the ring, which feelers engage the spacers on the annular flange shortly before the end of the ram stroke. Thus, the stroke is automatically corrected by the spacers and emitters.

The stroke device by which the slide resiliently engages the cross-beam during operation of the ram preferably has two slide shoes connected to the slide and movable on guide surfaces of the beam each having a two-armed lever, one arm of which is linked to the slide and the other arm being connected resiliently to the piston of the ram. Movement of the piston then engages the shoes with the beam, thereby providing counterbalancing upward force to the slide before the platen engages the knife. Distortion of the slide upon platen and knife engagement is thus avoided.

DESCRIPTION OF THE DRAWINGS

A preferred embodiment of the invention which is intended to be illustrative of and not a limitation on the invention will now be further described with reference to accompanying drawings, in which:

FIG. 2 is a vertical section taken on the line II—II of the embodiment shown in FIG. 1 with certain parts cut away;

FIG. 3 is a vertical section similar to that in FIG. 2 with certain parts in a different operative position.

DESCRIPTION OF THE PREFERRED EMBODIMENT

In FIGS. 1, 2 and 3, 10 designates a rigid work table of the machine above which extends a beam 12 having two profiled carrier portions. The work table 10 and the profiled carrier beams 12 are connected by side frames (not shown) to a rigid machine frame.

Figure 1:
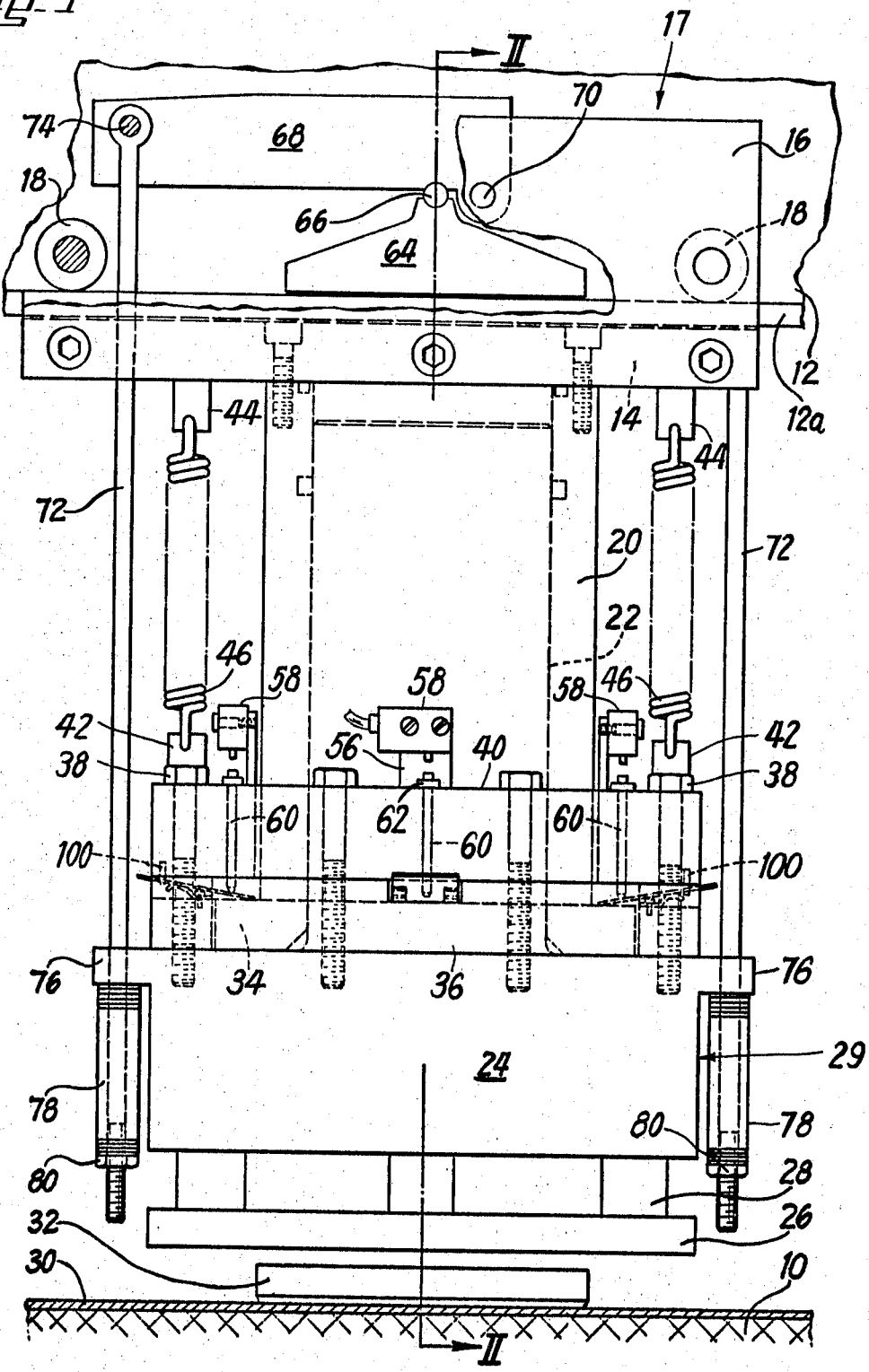
FIG. 1 is a view in front elevation of part of a cutting machine incorporating the preferred embodiment.

A plate 14 located beneath the profiled carrier portions of the beam 12 together with side walls 16 secured to its edges forms a slide indicated generally at 17 (FIG. 1). The slide 17 is mounted for movement on the beam 12 by rolls 18 journaled on the side walls 16 to engage outflanges 12a of the profiled carrier portions 12. Some small play between the plate 14 and flat undersides of the profiled carriers 12 insures a friction-free movement of the slide on the beam.

A cylinder portion 20 of an hydraulic ram is secured to the underside of the plate 14. A piston 22 of the ram extends downwardly from the slide 17 and supports a massive intermediate plate 24 on its lower end. A striker plate 26 is secured by insulating bodies 28 to the underside of the intermediate plate 24; together, these plates form a platen generally designated 29. The striker plate 26 is connected with a high frequency energy source (not shown) and, upon operation of the piston 22, applied pressure to a cutting knife 32 placed on workpiece material 30 (FIGS. 1, 2) to be welded and cut on the work table 10.

The cylinder 20 of the ram additionally has at its lower end a radially extending flange 34. The intermediate plate 24 has an annular rib 36 on its upper side, radially outside the flange 34, which serves as a carrier and spacer for a massive ring 40 secured to the intermediate plate 24 by machine screws 38. The internal diameter of the massive ring 40 is only slightly larger than the outer diameter of the cylinder 20 so that the ring 40 and the flange 34 can abut to form means for limiting the stroke of the piston of the hydraulic ram.

Between lugs 42 on the heads of the screws 38 and lugs 44 on the underside of the slide plate 14 are tension springs 46 which, as seen in FIGS. 1 and 2, when the hydraulic ram is not under pressure, raise the piston 22 together with the intermediate plate 24, the striker plate 26 and ring 40 until the intermediate plate 24 engages the flange 34. As seen in FIG. 2, pressure fluid may be admitted to the cylinder 20 through a port 48 (FIG. 2) in the plate 14; the port 48 is connected to an appropriate source (not shown) of pressurized fluid. The pressure fluid drives the piston 22 partly out of the cylinder 20 and the striker plate 26 hence engages the cutting knife on the material to be welded and cut. The fluid pressure is initially low so that no severing of the material takes place during a welding operation during which high frequency energy is supplied to the platen and knife from the appropriate source. Only when the welding operation is terminated is the pressure increased and the material 30 cut by pressing the knife through the material with the platen. The platen moves toward the table until the massive ring 40 engages the annular flange 34, thereby preventing any damage to the table by a cutting knife of a height equal to the initial spacing of the ring and flange.

To permit adjustment for knives of other height and further improve the operation of the machine, four peripherally arranged gaps 50 (FIGS. 2 and 3) near the upper edge of the annular rib 36 enable spacers 52 to be introduced between the ring 40 and the flange 34; these permit the cutting stroke to be shortened to suit deeper cutting dies. Curved plate springs 54 in the gaps 50, respectively, bias the spacers 52 against undesired falling out. Above the gaps 50 the ring 40 carries lugs 56 on which are secured electric impulse emitters, here shown as limit switches 58, having downwardly directed actuator members. The actuator members of the limit switches 58 are aligned with plungers 60 which project through and are freely movable in vertical bores in the massive ring 40. When the piston 22 is retracted upwardly, the plungers 60 are supported by collars 62 engaged with the upper surface of the ring 40 in such a manner that their lower ends project from the bores in the ring 40, as shown in FIG. 2. When the piston 22 advances downward, the projecting lower ends of the plungers 60 may engage the annular flange 34 and operate as abutments for triggering the actuator members of the limit switches 58. The length of the plungers is selected so that actuation of the limit switches 58 occurs only when the ring 40 engages the annular flange 34. Selection of the length of the plunger adjusts the machine for other knife heights. Alternatively and preferably, the plungers engage the spacers 52 whose positions in the gaps 50 may then be adjusted as by screws 100 (FIG. 1) to adjust for knife heights. According to the construction of the limit switches as "make" or "break" contacts, these are arranged in series or in parallel, respectively, within an electrical actuating circuit (not shown) by which a signal for the return stroke of the ram is effected, so that a return stroke impulse signal is only imparted when all four limit switches are actuated. Assurance is thereby given that the ring 40 has engaged the annular flange 34 free of distortion relative to the ram.

Figure 4:
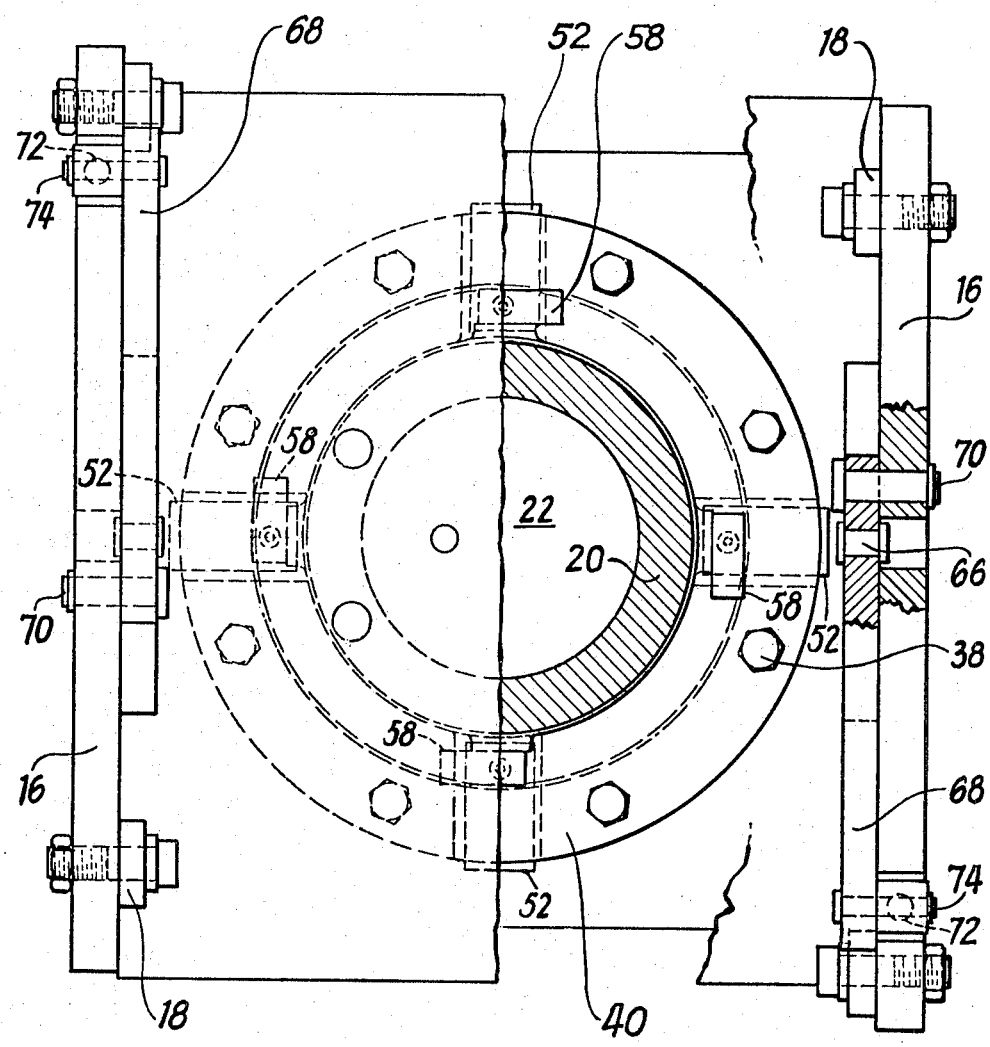
FIG. 4 is a top view, partly in section, taken on the line IV—IV of FIG. 3, of the embodiment shown in FIG. 1.

To assure parallelism of the platen 29 and the table 10, the ram must be distortionlessly oriented relative to the beam 12, known to be parallel to the table 10. For this purpose, a slide shoe 64 (FIG. 1) is arranged between each set of rolls 18 engaged with the beam 12. A pivot pin 66 is placed at a highest central point on the upper surface of each shoe. A two-armed lever 68 (FIGS. 1, 4) is mounted on the pivot pin 66. One arm of the lever 68, which is relatively shorter, is connected by means of a bolt 70 to the adjacent side wall 16 of the slide 17. The other substantially longer arm of each lever 68 is connected to a tie rod 72 (FIG. 1) by a bolt 74. The tie rod projects through lug 76 on the intermediate plate 24. Beneath the lug 76, the tie rod 72 carries a number of plate springs 78, which are supported by a nut 80 on the lower end of the rod 72.

When the ram is retracted, a certain distance exists between the uppermost plate spring 78 and the lug 76 of the intermediate plate 24, which distance provides lost motion when the ram is operated before compression of the plate springs 78 is initiated. In each case, however, springs 78 are adjusted by means of the nut 80 so that they are tensioned when the striker plate 26 engages the cutting die 32. The spring adjustment is such that they pull the tie rod 72 to pivot the lever 68 on the bolt 70. The pivot pin 66 then forces the slide shoe 64 into engagement with the outflanges of the beam 12. The entire slide is thus raised until the slide plate 14 is raised against the underside of the profiled beam carriers 12. Levers 68 are symmetrically disposed on both carriers of the beam 12 so that the slide plate 14 is raised without distortion and is uniformly pressed in its area of engagement against the underside of the profiled beam carriers 12. Thus it is insured during welding as well as cutting that the axis of the ram is directed normally to the table and the platen 29 is thus parallel to the table.

In several instances only one of several duplicate parts of the machine has been described. It will be understood that the operation of the other duplicate parts is the same as for that described. It is also understood that this invention is applicable to non-high frequency cutting machines of the beam and table type described.

Having thus described my invention, what I claim as new and desire to secure by Letters Patent is:

1. In a cutting machine having a piston driven platen for forcibly engaging a die against a workpiece and table, said platen being slidably supported through the piston and cylinder means on a beam having a surface which is accurately oriented in parallel relation to the work surface of the table, means for insuring even engagement between the work surface of the platen and the die during cutting comprising:

A. stroke limiting means connected to the piston driven platen having a surface parallel to the work surface of the platen for engagement with a surface on the machine which is locked in parallel relation to the work surface of the table;

B. clamping means operatively connected to the platen to lock a machine surface against the beam in parallel relation to the work surface of the table as the platen moves into engagement with the die; and C. limit switch means actuatable at a plurality of points about the engagement surface of the stroke limiting means when said means are engaged to maintain the work stroke of the platen until each of the limit switches has been actuated.

* * * * *